United States Patent [19]

Wells

[11] 4,281,640
[45] Aug. 4, 1981

[54] ELECTROMAGNETIC RADIATION COLLECTOR SYSTEM

[76] Inventor: David N. Wells, 607 Valley Brook Dr., Silver Spring, Md. 20904

[21] Appl. No.: 836,538

[22] Filed: Sep. 26, 1977

[51] Int. Cl.³ ............................................. F24J 3/02
[52] U.S. Cl. ................................. 126/438; 126/439; 60/641 AB
[58] Field of Search ............... 60/641; 126/270, 271, 126/438, 439

[56] References Cited

U.S. PATENT DOCUMENTS

| | | | |
|---|---|---|---|
| 1,575,309 | 3/1926 | Anderson | 126/271 |
| 1,989,999 | 2/1935 | Niederle | 126/271 |
| 2,803,591 | 8/1957 | Coanda et al. | 126/438 X |
| 2,976,533 | 3/1961 | Salisbury | 126/270 |
| 3,118,437 | 1/1964 | Hunt | 126/378 |
| 3,171,403 | 3/1965 | Drescher | 126/270 |
| 3,861,379 | 1/1975 | Anderson, Jr. | 126/271 |
| 3,884,217 | 5/1975 | Wartes | 126/271 X |
| 3,915,147 | 10/1975 | Rineer | 126/438 X |
| 4,000,733 | 1/1977 | Pauly | 126/270 |
| 4,010,614 | 3/1977 | Arthur | 126/270 |
| 4,061,130 | 12/1977 | Gonzalez | 126/271 |
| 4,068,474 | 1/1978 | Dimitroff | 126/271 X |
| 4,129,119 | 12/1978 | Yoke | 126/271 |

FOREIGN PATENT DOCUMENTS 937904  12/1946  France .................................... 126/438

Primary Examiner—Allen M. Ostrager

[57] ABSTRACT

An improved electromagnetic radiation collector system for concentrating electromagnetic radiation emitted from a source to a collecting mechanism. The radiation collector system includes a plurality of primary reflectors which are moveably actuated responsive to a displacement of the electromagnetic radiation source. The primary reflector members reflect and concentrate the source emitted radiation to a secondary reflector which is positionally located substantially at the focal length of the displaceable primary reflector members or plates. The secondary reflector is particularly contoured and reflectively coated to reflect the initially concentrated reflected radiation to a substantially line focus. The secondary reflector may be stationary or formed of a plurality of rotatable reflecting members. Radiation reflected from the secondary reflector is focused upon a line collector mechanism or heating a fluid medium passing therethrough. Additionally, the second reflector may reflect radiation to a light redirecting mechanism having an absorbing face substantially located along the focus line of the secondary reflector elements.

39 Claims, 9 Drawing Figures

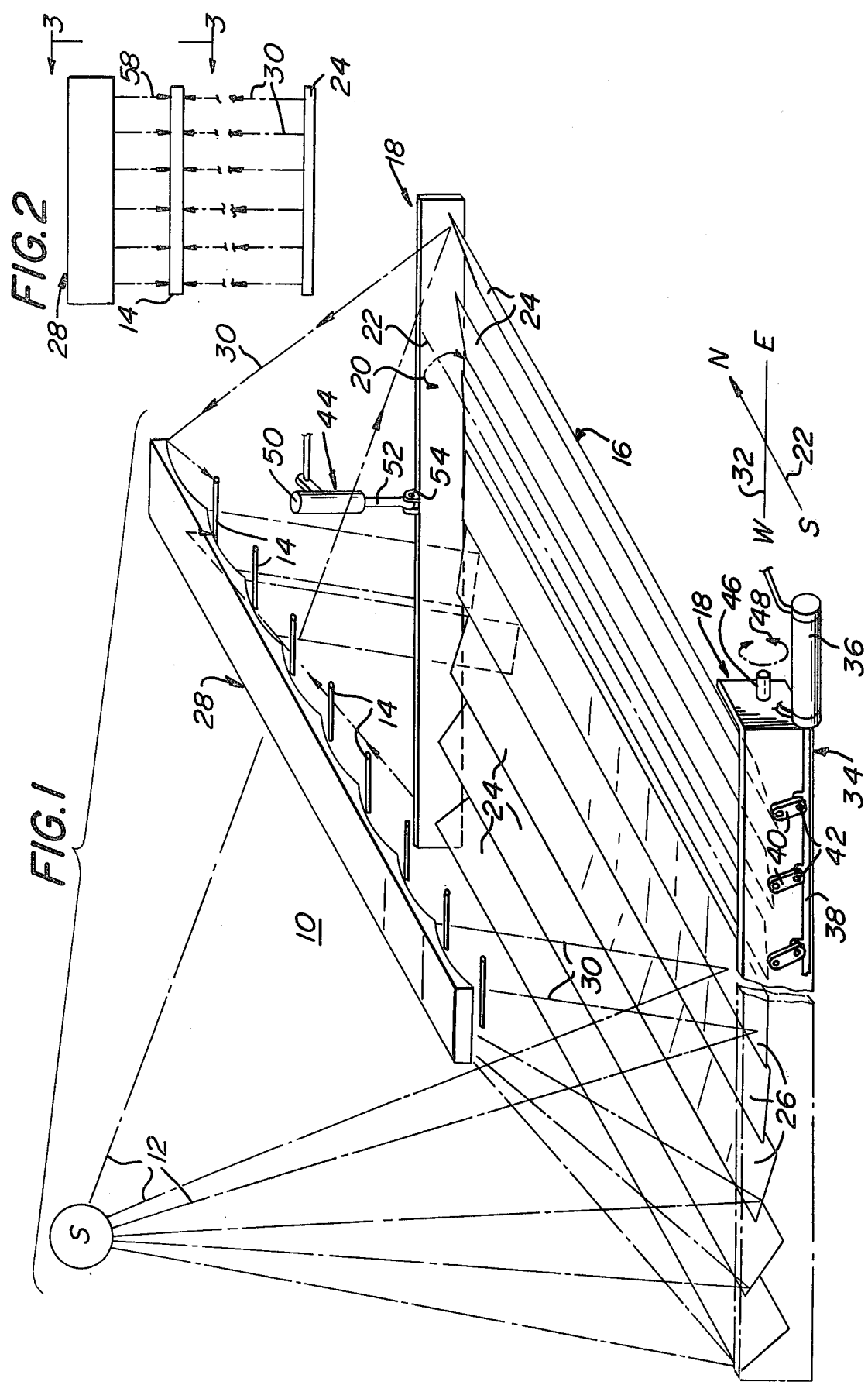

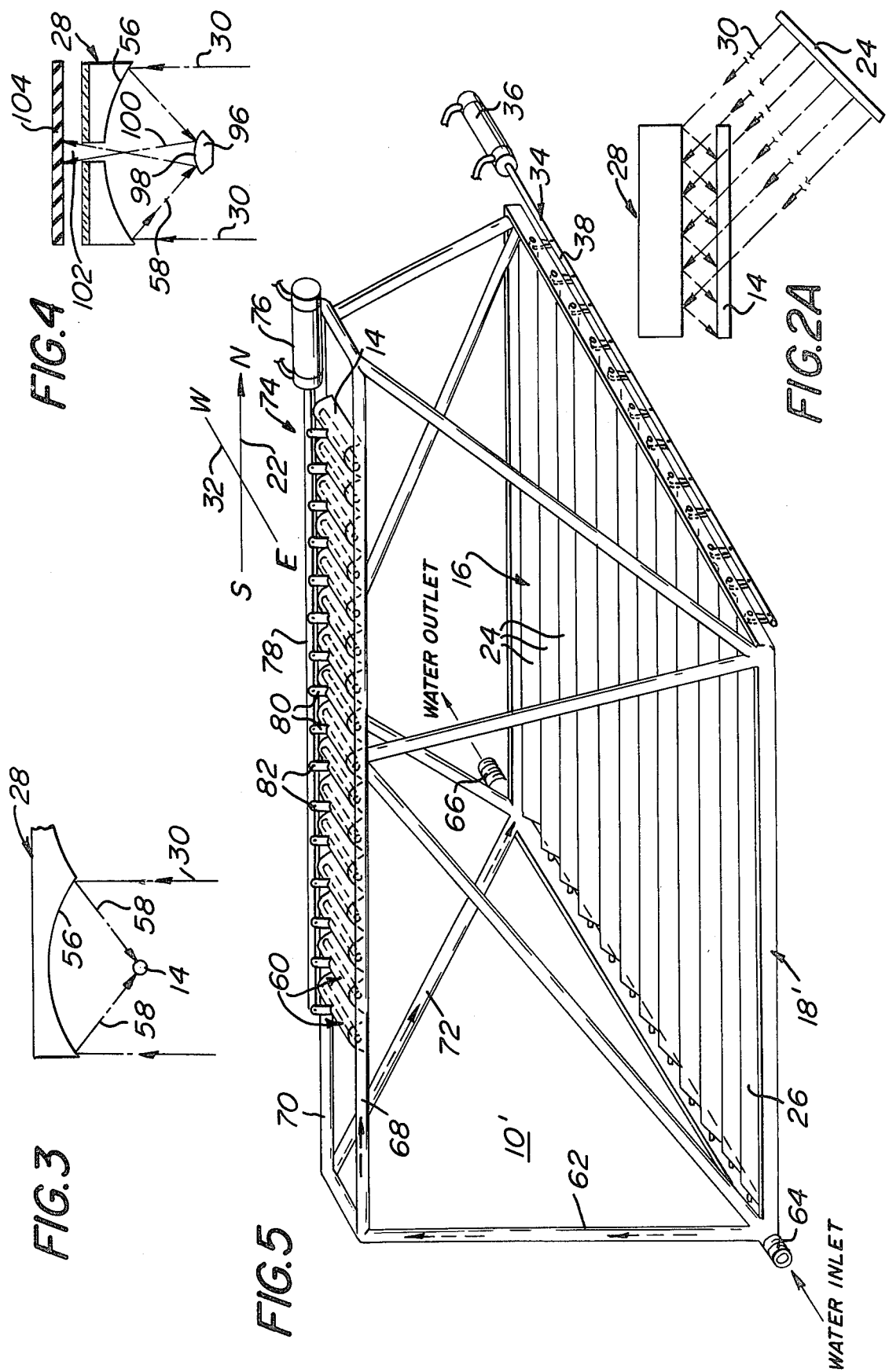

4,281,640

ELECTROMAGNETIC RADIATION COLLECTOR SYSTEM

BACKGROUND OF THE INVENTION

1. Field of the Invention

This invention relates to electromagnetic radiation collector systems. In particular, this invention pertains to collector systems where the source of the electromagnetic radiation may be solar generated. Still further, this invention relates to a radiation collector system which utilizes two stage concentration of initially emitted solar radiation. Additionally, this invention pertains to an improved efficiency system where emitted electromagnetic radiation is concentrated in two stages prior to insertion into a collecting mechanism.

2. Prior Art

Solar concentrating systems are well-known in the art. Additionally, two axis tracking of a source displacement are also known in the art. In some prior art where two cylinder lenses are placed normal each to the other, a point focus is achieved. However, such prior art systems do not utilize linear receivers to break up a line of focus through a two stage reflection process to provide a linear focus. This allows inherent simplicity in the formation of a primary reflector and optimizes the concentration of the emitted electromagnetic radiation from the source.

In some prior art solar concentrators, shading problems have been found due to the fact that upper reflecting elements shade a large portion of a lower reflector from the source of emitted radiation. In such prior art systems, the upper frontally faced reflecting members include a surface area which is substantial when compared to the lower primary reflectors and thus a low efficiency of radiation concentration is provided.

In some prior art solar concentrating systems, a primary collector had to be moved during two axis tracking. Such prior systems did not provide for the mere rotative displacement of a plurality of linearly facing planar plates. Such prior systems had to rely on complicated hardware and tracking systems to provide for the necessary appropriate orientation. Other prior art systems in the solar concentrating field have utilized massive hardware to provide movement of collection mechanisms which has resulted in large capital expenditures as well as a lower reliability as provided by the instant invention concept.

SUMMARY OF THE INVENTION

An electromagnetic collector system for concentrating and absorbing radiation emitted by a radiation source. The collection system has a frame member and at least one primary reflector which is secured to the frame member. The primary reflector has at least a first axis of rotation extending in a substantially longitudinal direction for reflection of the radiation emitted by the source. A secondary reflector is positionally located substantially at a focal length of the primary reflector and an electromagnetic radiation collector mechanism is mounted to the frame member substantially at a focus of the secondary reflector.

BRIEF DESCRIPTION OF THE DRAWINGS

FIG. 1 is a perspective view of the elctromagnetic radiation collector system taken partially in a cut-away view;

FIG. 2 is an elevational view of the electromagnetic radiation collector system 10 shown in schematic form to provide edification of the radiation path;

FIG. 2A is a schematic elevational view of the system shown in FIG. 1 showing the plate members of the primary reflector being inclined responsive to a particular orientation of the electromagnetic radiation source;

FIG. 3 is a frontal view of the secondary reflector taken along the section line 3—3 of FIG. 2;

FIG. 4 is an elevational view of an embodiment of the invention showing the secondary reflector placed in combination with a convex mirror for redirection of reflected radiation to a receiver;

FIG. 5 is a perspective view of an embodiment of the invention showing a rotatable secondary reflector mechanism;

DESCRIPTION OF THE PREFERRED EMBODIMENTS

Figure 6:
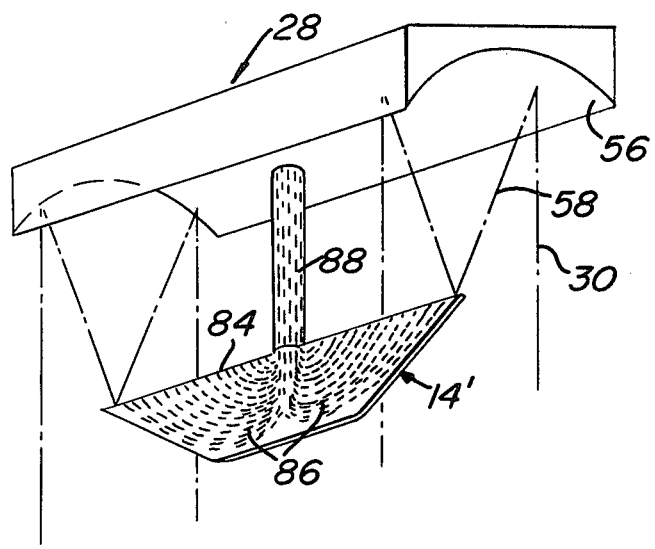
FIG. 6 is a perspective view of a portion of the secondary reflector utilizing a fiber optic element located at the focus line of the secondary reflector.

Referring now to FIGS. 1-3, there is shown electromagnetic radiation collector system 10 for concentrating and absorbing radiation 12 emitted by radiation source S. System 10 and various embodiments thereof to be further described in following paragraphs, is particularly utilized for concentrating, absorbing, as well as redirecting, particular wave length intervals of the electromagnetic radiation spectrum. In overall concept, system 10 is directed to a two-axis type of tracking system providing a multiplicity of concentration stages which reduces a broad area of reflection in the initial stage of reflection to a line focus having positioned therein a multiplicity or plurality of collectors 14. Although shown and described for particular utilization of solar radiation emission and concentration, it is to be understood that system 10 may be utilized with a generally defined radiation source S.

Electromagnetic radiation collector system 10 includes primary reflector 16 which is secured on opposing ends thereof to frame member 18. Primary reflector 16 has a first axis of rotation as shown by arcuate directional arrows 20, about longitudinal direction 22. Longitudinal direction 22 is provided by the directional arrow N-S which defines a North-South direction generally providing for the positional placement of system 10 when source S is the sun and allows for concentration of radiation rays 12 during displacement of source S throughout a solar day. Primary reflector 16 may include a plurality of plate members 24, each of which has a primary reflecting surface 26 for reflecting rays 12 to secondary reflector 28. Plate members 24 may in general include substantially planar reflecting surfaces 26 and are rotationally activated about longitudinal direction 22 to provide concentration of reflected radiation rays 30 on secondary reflector 28. Each of plate members 24 and associated planar reflecting surfaces 26 are rotationally activated in a manner to be described in following paragraphs, responsive to displacement of source S in an arcuate direction substantially defined by directional arrow 32 shown by the numeral 32 and referred to as a transverse direction when taken with respect to longitudinal direction 22.

Each of plate members 24 may be mirror coated or otherwise provided with a highly reflective coating for emitted radiation rays 12, such techniques being well-known in the art. The manner and particular type of reflecting surface 26 provided for each of planar plate members 24 is not important to the inventive concept as is herein described with the exception that reflecting surfaces 26 provide a high degree of reflectivity for concentration of reflected radiation 30. Additionally, in overall concept, rotational displacement of plate members 24 is provided to concentrate rays 12 into a reflecting mode defined by reflected radiation 30 into a substantially smaller area as defined by the upper plane surface of secondary reflector 28. Thus, the flux density of reflected radiation rays 30 is greater than emitted radiation rays 12 impinging on plate members 24. Each of plate members 24 is angled about longitudinal direction 22 in a particular fashion, well-known in the art, to provide for impingement of reflected radiation rays 30 on secondary reflector 28. Thus, it is clearly seen that emitted electromagnetic radiation 12 impinging on a large surface area as defined by plate members 24, is concentrated through particular orientation of plate members 24 to provide concentration of ray flux density wherein reflected radiation rays 30 impinge on secondary reflector 28.

Electromagnetic radiation collector system 10 includes primary reflector displacement mechanism 34 which is operative responsive to displacement of radiation source S in arcuate transverse direction 32 for reflecting impinging radiation 12 to secondary reflector 28 throughout some predetermined time interval generally being a solar day. Primary reflector displacement mechanism 34 includes linear actuation mechanism 36 for linearly displacing rod member 38 in reversible transverse direction 32. A plurality of connector links 40 are rotatably mounted to rod member 38 at pivot points 42 and are secured to primary reflector 16 on opposing ends of individual plate members 24. Linear actuation mechanism 36 may be one of any number of commercially available power cylinders, well-known in the art, which may be utilized for linear displacement of rod member 38 in reversible direction 32. Thus, the mechanism utilized for rotating plate members 24 about a first axis line defined by longitudinal direction 22 is of a window-blind mechanism. In this manner, once the particular orientation of each of plates 24 is provided with respect to the positional placement of source S, linear displacement mechanism 34 may be operated to provide rotational displacement of each of plate members 24 in unison.

In the embodiment shown in FIG. 1, secondary linear actuation mechanism 44 is provided to rotationally activate frame member 18 about transverse direction 32 to account for inclination of source S with respect to plate members 24 of primary reflector 16. Various actuation methods may be provided, in the case as shown in FIG. 1, frame member 18 is rotated about pivot rod 46 as defined by arcuate arrows 48. Secondary linear actuation mechanism 44 may include a secondary power cylinder 50, well-known in the art, adapted to linearly displace secondary rod 52 in a reversible vertical direction. Secondary rod 52 is pivoted to a wall member of frame 18 at pivot point 54 to allow rotative displacement between the wall member of frame 18 and the linearly moveable secondary rod 52.

In the manner as previously described, plate members 24 of primary reflector 16 may thus be rotated in two normal axes. Actuation of primary reflector displacement mechanism 34 permits plates 24 to be rotated about first axis or longitudinal direction 22 while actuation of secondary linear actuation mechanism 44 permits rotation of plate members 24 about transverse or second axis of rotation 32. As has been described, first axis of rotation 22 and second axis of rotation 32 are substantially normal or perpendicular each to the other.

System 10 further includes secondary reflector 28 secured to frame members 18 and positionally located substantially at a focal length of oriented plate members 24. Referring now to FIGS. 2 and 3, secondary reflector 28 includes secondary reflector surfaces 56 having a predetermined contour for secondarily reflecting reflected radiation rays 30 to a substantially line focus. As is seen in FIG. 1, the underside of secondary reflector 28 may be formed of a plurality of contoured reflector surfaces 56 for redirecting or secondarily reflecting rays 30 to collectors 14 positionally located at substantially a line focus of secondary reflector surfaces 56. Generally, secondary reflector surfaces 56 have been successfully used when formed in a parabolic contour for providing secondary reflection rays 58 in a directed path to collectors 14. As can be seen, secondary reflector 28 includes a plurality of secondary reflector surfaces 56 extending in longitudinal direction 22 substantially throughout the extended longitudinal direction length of plates 24. As was the case for plate members 24, secondary reflector surfaces 56 may be mirror coated or otherwise provided with a high reflective coating such as highly polished aluminum or some like reflecting type surface. Additionally, it is noted that the focus line of secondary reflector 28 extends substantially normal primary reflector first axis of rotation as defined by longitudinal direction 22. In the embodiment shown in FIG. 1, secondary reflector 28 is mounted in a stationary manner with respect to the displacement of primary reflector 26 and associated plate members 24 as well as the displacement of source S. Thus, secondary reflector 28 of FIG. 1 may be fixedly secured to a base surface or to a portion of frame member 18 which does not move or is not displaced with respect to ground conditions.

In overall concept, it is now seen that initially emitted rays 12 from source S impinge and are reflected from a plurality of plate members 24. Particular orientation of plate members 24 result in a plurality of initially reflected radiation rays 30 to concentrate emitted rays 12 to a plurality of secondary reflector surfaces 56. Reflected rays 30 which are concentrated in the first stage are further concentrated due to the parabolically contoured reflector surfaces 56 to collectors 14 which are mounted at a line focus of surfaces 56.

One form of collectors 14 may include tubular absorption members which are secured in some fixed relation to frame members 18 or to an external stationary surface and such absorption tubular members may include a radiation absorbing medium flowing therethrough. The medium may be water or other liquid or gas which is to be heated by the secondary reflection rays 58 impinging on an outer peripheral surface of tubular members 14. Such tubular members 14 may be formed of aluminum, optically transparent, or some metallic formation generally having a high solar absorption type coating to maximize the heat absorption capabilities of tubular members 14 to heat the particular medium flowing therethrough. The particular coupling of collector members 14 shown in FIG. 1 are not provided in the illustration since such are not generally important to the inventive concept as is herein described and detailed and a number of parallel fluid connections may be made to provide appropriate hardware considerations prior to and subsequent to the heating of the flowing medium.

Referring now to FIG. 5, there is shown an embodiment collector system 10' providing for rotational actuation of a plurality of secondary reflectors 60 in combination with the use of frame member 18' for passage of a heat absorbing medium. In this embodiment of the invention, secondary reflectors 60 are rotatably mounted to frame member 18'. Secondary reflectors 60 are adapted to be rotated about a secondary reflector rotation axis extending substantially normal to primary reflector axis of rotation 22. As is seen, secondary reflectors 60 are mounted adjacent each to the other in direction 22 and extend either substantially throughout the longitudinal extension of primary reflector 16 or throughout some segment portion of the longitudinal extension. As was the case for system 10, collector units 14 of system 10' are mounted substantially along a line focus of rotationally activated secondary reflectors 60 for absorption of secondarily reflected rays 58.

Frame member 18' may be formed of a multiplicity of tubular members 62 defining a flow path of heat absorbing medium from inlet section 64 to outlet section 66. In one form of the invention, it is seen that heat absorbing medium may enter through inlet 64, and be passed in a substantially vertical direction through tubular member 62 into the plane of secondary reflectors 60. The incoming medium is further flowed through horizontal tubular flow members 68 and directed to collectors 14 which are in fluid communication with tubular flow members 68. The heat absorbing medium passes through tubular members comprising collectors 14 wherein heat is absorbed by the flowing medium and egresses at an end point of collectors 14 which are in fluid communication with horizontal tubular outflow member 70. The medium then is directed to outlet conduit 72 and finally to medium outlet 66 where the heated fluid is utilized for other purposes. It is to be understood, that the particular flow path and utilization of the tubular members of frame 18' is only provided for illustrative purposes, and that there are a number of variations which may be provided for particular flow paths of the heat absorbing medium. However, this embodiment does provide one particular elemental structure which in combination allows for the utilization of the structural members of frame 18' to be utilized for fluid flow.

In the embodiment shown in FIG. 5, there is shown the same primary reflector displacement mechanism 34 which provides for rotation of plate members 24 about longitudinal axis 22. However, in this embodiment described by system 10', each of secondary reflectors 60 are rotationally actuated about transverse direction line 32 through use of secondary reflector displacement mechanism 74. Secondary reflector displacement mechanism 74 includes third linear actuation device 76 which may be the same type of power cylinder utilized for linear actuation mechanism 36 of system 10 shown in FIG. 1. Third linear actuation mechanism 76 is connected to third rod member 78 which is displaceable in a linear manner in direction 22. Additionally, third rod 22 is rotatably connected to a plurality of third connector links 80 which are pivotally connected to third rod member 78 at pivot points 82. Third connector rods 80 are fixedly secured to an upper surface of secondary reflectors 60. Thus, linear displacement of third connector rod 80 in longitudinal direction 22 provides for rotation of secondary reflectors 60 when taken with respect to frame 18'.

As was the case in system 10, each of secondary reflectors 60 may be formed in a substantially parabolic reflecting type contour to provide a line focus where collectors 14 are positionally mounted. In this manner, there is accomplished the two stage type concentration of emitted radiation from source S as was provided by system 10 shown in FIGS. 1–3.

Referring now to FIG. 6, there is shown an embodiment where there is provided electromagnetic radiation collector 14' formed of a fiber optic composition. In this embodiment of the inventive concept, there is a redirection and an internal predetermined path given to the reflected light radiation rays. In this embodiment, collector 14' includes radiation receiving face 84 which extends and is positionally located at the focus of secondary reflector 28. Reflected radiation rays 30 impinge on parabolically contoured surface 56 of secondary reflector 28 and secondary reflection rays 58 are directed to radiation receiving face 84.

Although a number of geometrics may be provided, collector 14' as shown in FIG. 6 includes a substantially inverted T-shape where rays 58 are internally directed on opposing transversely directed arm members 86 and directed upwardly through centrally disposed fiber optic rod member 88. The light radiation rays directed through central rod member 88 may be directed to solar cells or to some other system where the concentrated light may be transferred to some other type of energy transformation.

Figure 7:
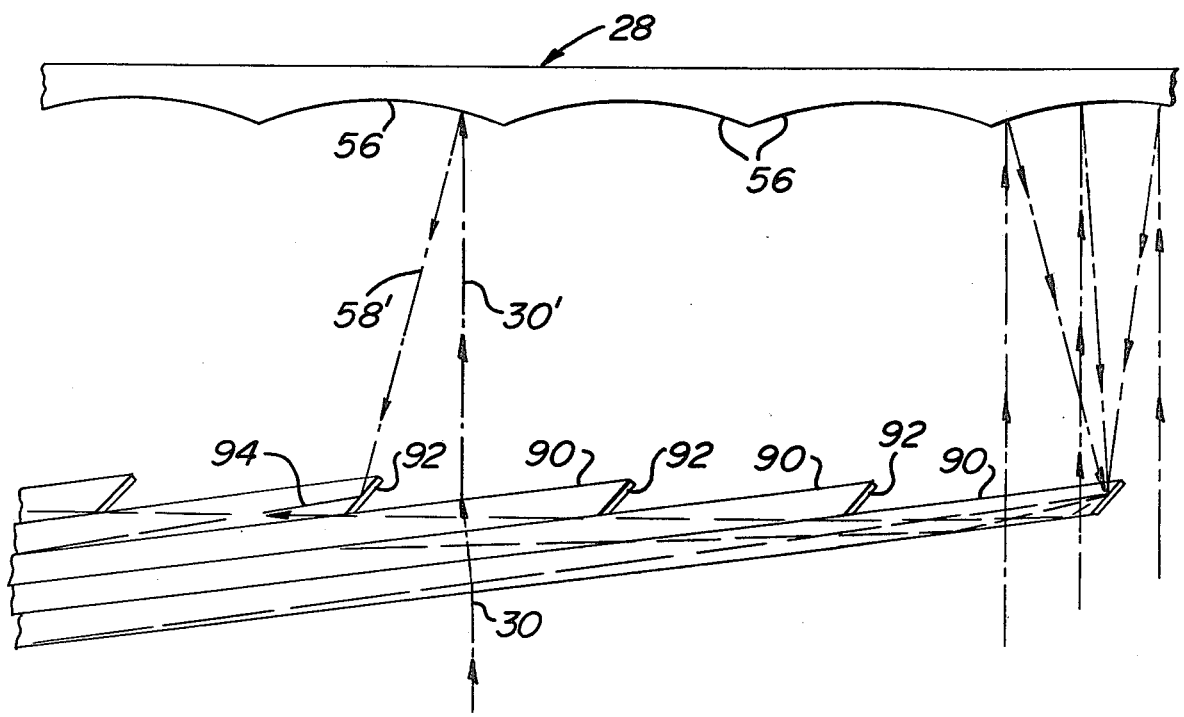
FIG. 7 is another embodiment of the subject invention showing the secondary reflector in combination with a plurality of transparent plate members having a mirrored beveled edge for redirecting light impinging thereon from the secondary reflector; and, FIG. 8 is a schematic diagram showing the use of the electromagnetic radiation collector system of the subject invention in combination with a series of power system elements.

Another embodiment of the instant invention is shown in FIG. 7 where another type of internal redirection of the light rays may be accomplished utilizing the same basic collector system as has hereinbefore been provided. In this embodiment, reflected radiation rays 30 passing from primary reflector 16 pass through optically transparent members 90. Reflected radiation 30 is refracted in passage through transparent members 90 and emerge as refracted radiation rays 30'. Rays 30' impinge on secondary reflector 28 on reflecting surfaces 56 which are generally parabolically contoured as has hereinbefore been described. Refracted and reflected rays 30' are reflected from secondary reflector surfaces 56 and provide reflected rays 58'. Silvered or otherwise mirror coated beveled surfaces 92 of optically transparent members 90 are positionally located along the focus line of each of parabolic surfaces 56. The beveling of surfaces 92 in combination with the mirror-like coating applied thereto produces a series of internally redirected rays 94 which may be passed to a collection point in a manner similar to that as provided for FIG. 6 with the exception that in this embodiment, optically transparent members 90 are not formed of fiber optic elements.

Referring now to FIG. 4, there is shown another embodiment of the invention where another mode of redirection of electromagnetic radiation is provided. In this embodiment, reflected radiation 30 from primary reflector 16 impinges on and is reflected from secondary reflector surface 56 of secondary reflector 28. Surface 56 is generally parabolic in nature and reflects secondary reflection rays 58 to convex reflecting element 96 positionally located at substantially the line focus of parabolically contoured surface 56. Convex reflecting element 96 includes reflecting surface 98 which reflects reflection rays 100 through opening 102 formed vertically through secondary reflector 28. Reflection rays 100 impinge on receiver 104 which may be solar cells or some other form of receiver element or transposing heat or light energy to electrical or some other type of output energy consideration.

Figure 8:
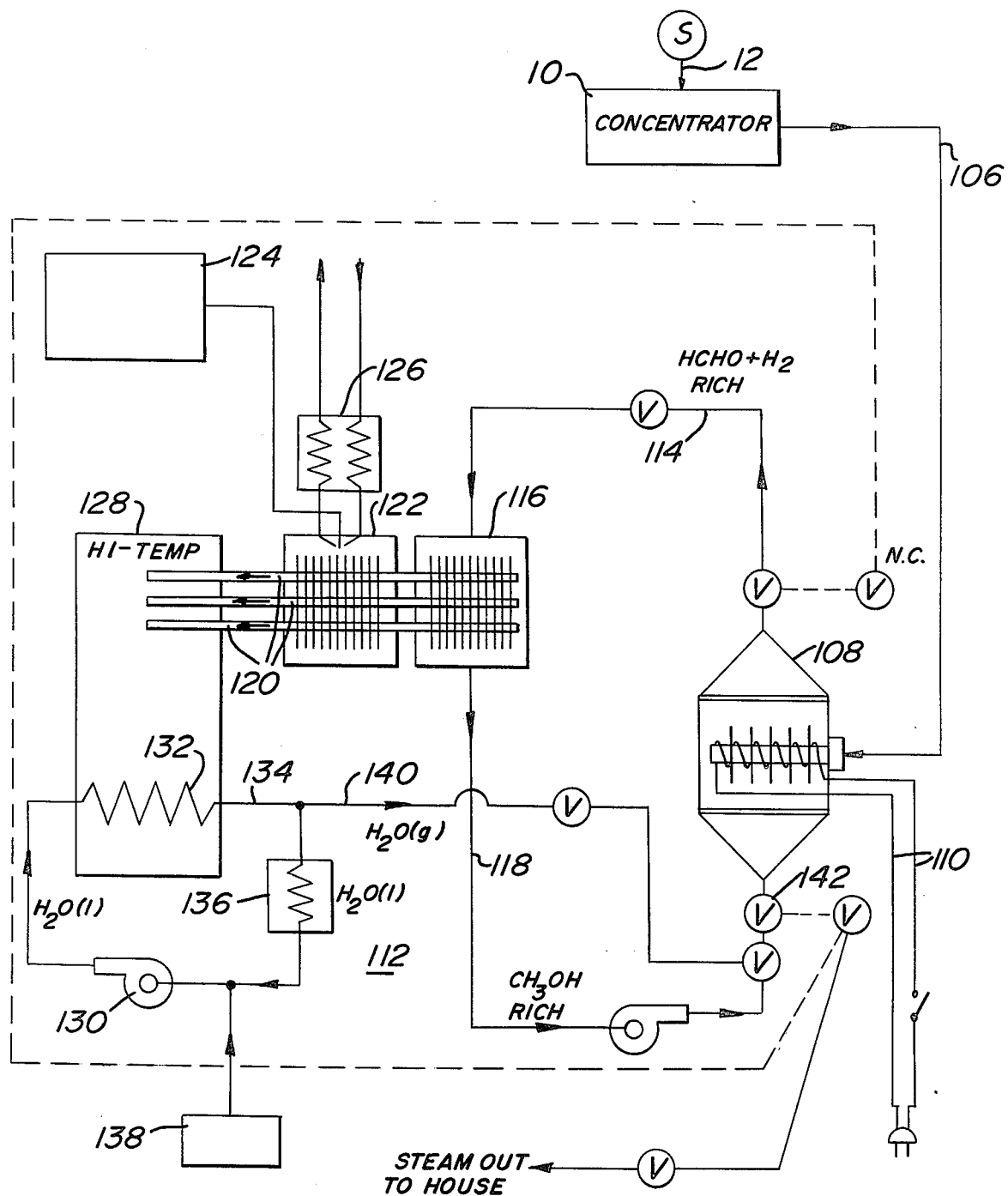

Referring now to FIG. 8, there is shown a schematic diagram of one type of energy power system 112 utilizing electromagnetic radiation collector system 10 of the present invention concept. In energy power system 112, emitted radiation 12 from source S is converted within electromagnetic radiation collector system 10 to provide energy transport through radiation energy conduit 106 at the output of radiation collector system 10. Energy is inserted to a catalyst/oxide tank 108. Tank 108 may generally include a bed of decomposable heat storage material selected from the group consisting of hydroxides of calcium, magnesium, and barium. The overall working concept of catalyst/oxide tank 108 is that thermal energy may be stored through thermal heating of the heat storage material to a temperature ranging to a temperature approximating 500° C. which in general would be above the decomposition temperature of a particular hydroxide. This heating is provided for a time interval large enough in order that an endothermic chemical decomposition of the particular hydroxide is effected in order to form a corresponding oxide and water vapor. In the event that system 10 does not produce sufficient energy for appropriate operation of tank 108, alternate electrical energy input is provided by outlet 110 to produce sufficient temperatures for decomposition of the particular heat storage material within catalyst/oxide tank 108.

In one preferred embodiment of energy power system 112, catalyst/oxide tank 108 dehydrogenates methyl alcohol to form a gas of hydrogen and formaldehyde (HCHO). The overall equation is provided:

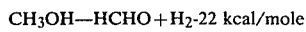

$$CH_3OH \rightarrow HCHO + H_2 - 22 \text{ kcal/mole}$$

This reaction is an endothermic reaction and efficiently transports heat due to the fact that both the products and the reactants are substantially in equilibrium within a temperature range of 400° C.–600° C. which is an optimum range of operation for the reaction of water vapor with calcium oxide. The discharged gas passes through discharge conduit 114 and is directed to secondary reactor 116.

The catalytic secondary reactor 116 converts the discharged gas $HCHO + H_2$ to an output of $CH_3OH$ through output conduit 118 while emitting heat transferred to a plurality of heat pipes 120. In the event that sufficient heat is not produced for actuation and operation of the remainder of the system 112, secondary burner 122 having an alternate fuel reservoir 124 is provided to further provide heat transport to heat pipes 120. Secondary burner 122 may include a standardly operating preheater 126 to increase the overall efficiency of system 112.

Heat energy from heat pipes 120 are inserted into engine 128 which may be of the Sterling type. Sterling engine 128 provides for mechanical work output.

For operation of catalyst/oxide tank 108, it is necessary to provide boiling water for the calcium oxide reaction in the discharge cycle. This water is available from the low temperature heat output of Sterling engine 128. Note that water is pumped from pumping unit 130 through low temperature stage 132 of engine 128. Liquid water is taken from engine low temperature stage output 134 passed through radiator 136 and recycled through low temperature stage 132. Water may be drawn from water reservoir 138 through pump system 130 to provide the necessary quantity of water for overall operation of system 112. Water in the gaseous form is flowed through water conduit 140 and combined with the gaseous products passing through secondary reactor output conduit 118 for insert to catalyst/oxide tank 108 through input line 142.

Electromagnetic radiation collector system 10 as has hereinbefore been described provides a method for the collection of electromagnetic radiation in order to concentrate and absorb radiation rays 12 emitted by radiation source S. The method as is herein developed provides for a plurality of stages wherein emitted rays 12 are concentrated at each stage and reflected to a next consecutive stage of system 10 in order to optimally concentrate ray flux density impinging on collectors 14. In particular, the method as herein provided, allows for initial concentration from primary reflector 14 formed of a plurality of plate members 24 oriented in a predetermined relation to source S and secondary reflector 28. Secondary reflector 28 re-reflects reflected radiation 30 emitted from primary reflector 16 to produce secondary reflection rays 58 impinging on collectors 14 which are positionally located along a line focus of secondary reflector 28.

Initially, emitted rays 12 are reflected from primary reflector 16 in a predetermined direction path as provided by reflected radiation 30. By placement of secondary reflector 28 at a focal length of primary reflector members 24, reflection rays 30 provide for an initial concentration of emitted rays 12. Thus, concentration of radiation 12 is provided by positionally locating secondary reflector 28 at substantially the focal length of the overall primary reflector 16.

The step of concentrating radiation 12 includes the step of orienting primary reflector 16 in predetermined positional relation responsive to a displacement of source S. As can be seen in FIGS. 1 and 5, orientation includes the step of rotationally actuating primary reflector 16 and particular plate members 24 about an axis of rotation defined by longitudinal directional arrow 22 which is substantially normal to a path displacement plane of source S. As shown in FIG. 1, rotational displacement of planar reflector plate members 24 is provided for concentrating emitted rays 12. Additionally, in this preferred embodiment of system 10 and associated method, primary reflector 16 may be rotated about second axis 32 which extends in a direction substantially normal to first axis of rotation 22.

The step of reflecting radiation from primary reflector 16 is followed consecutively by secondarily reflecting radiation from secondary reflector 28 which is positionally located at a substantially focal length of the overall primary reflector 16. The step of secondarily reflecting reflected rays 30 includes the step of positionally locating at least one parabolic surface 56 of secondary reflector 28 at the hereinbefore described focal length distance between primary reflector 16 and secondary reflector 28. As can be seen in FIGS. 1 and 5, secondary reflector 28 is formed of a plurality of parabolically formed reflecting surfaces 58 which reflect radiation rays 58 to collecting means 14 positionally located substantially coincident with a line focus of parabolically contoured surfaces 56.

In the embodiment of system 10 and the associated method of concentrating electromagnetics radiation as provided in FIG. 5, the step of secondarily reflecting rays 58 includes the step of rotationally displacing secondary reflector elements 60 responsive to displacement of source S.

Subsequent to the secondary reflection step, radiation is collected which has been reflected from secondary reflector 28 along a focus line of secondary reflector 28 by radiation collection members 14. Radiation collection members 14 are positionally located substantially along a focus line of surfaces 56 of secondary reflector. An energy absorbing medium is generally flowed through radiation absorbing members 14 in a preferred embodiment of electromagnetic radiation collector system 10.

In another embodiment of the method as provided by system 10, the step of collecting radiation includes redirecting a predetermined portion of the wave length spectrum being reflected from secondary reflector 28 into a predetermined path contour. In this step, fiber optic element 14' serves as a collector member and there is positioned radiation intercepting surface 84 substantially coincident to a line focus of secondary reflector 28 and associated parabolic surfaces 56. Fiber optic element 14' includes a predetermined contour for directing radiation to a predetermined area where an energy conversion device such as a solar cell is located for conversion of the radiation energy to electrical energy.

In another embodiment of the method invention, the step of redirecting includes the step of inserting at least one substantially transparent member 90 between first and second reflectors 16 and 28 respectively. Transparent members 90 are adapted to internally direct a portion of the radiation wave length spectrum of reflected rays 58 into a predetermined path internal to members 90. Reflective surfaces 92 of members 90 are established and are directed substantially coincident with the secondary reflector line focus. Beveled surfaces 92 which are reflectively coated have a predetermined contour for redirecting radiation internal to transparent members 90.

Although this invention has been described in connection with specific forms and embodiments thereof, it will be appreciated that various modifications other than those discussed above may be resorted to without departing from the spirit or the scope of the invention. For example, equivalent elements may be substituted for those specifically shown and described. Certain structures may be used independently of others, and in certain cases, particular locations of elements may be reversed or interposed, all without departing from the spirit or the scope of the invention as defined in the appended claims.

What is claimed is:

1. An electromagnetic radiation collector system for concentrating and absorbing radiation emitted by a radiation source, comprising:
   (a) a frame member;
   (b) a primary focusing concentrator having at least a pair of primary reflectors secured to said frame member and having at least a first axis of rotation extending in substantially longitudinal direction passing through an extended length of at least one of said primary reflectors for reflecting and concentrating said radiation emitted by said source;
   (c) at least one secondary reflector being positionally located substantially at a focal length of said primary reflectors, said secondary reflector having a focus line extending substantially normal said first axis of rotation of said primary reflectors; and,
   (d) electromagnetic radiation collector means mounted to said frame at said focus line of said secondary reflector, said first axis of rotation of said primary reflector extending in a direction substantially normal to an extended direction of said electromagnetic radiation collector means.

2. The electromagnetic radiation collector system as recited in claim 1 where said collector system includes means for displacing said primary reflector responsive to a displacement of said radiation source for reflecting said radiation to said secondary reflector throughout a predetermined time interval 3. The electromagnetic radiation collector system as recited in claim 2 where said means for displacing the primary reflectors includes means for rotating said primary reflectors about said first axis of rotation responsive to said radiation source displacement.

4. The electromagnetic radiation collector system as recited in claim 3 where said, means for displacing said primary reflectors includes means for rotating said primary reflector about a second axis of rotation extending substantially normal said first axis of rotation, said first axis and said second axis forming a substantially horizontal reference plane.

5. The electromagnetic radiation collector system as recited in claim 3 where said first means for rotating said primary reflectors about said first axis includes:
   (a) linear actuation means secured to said frame for linearly displacing a rod; and,
   (b) at least one connector link rotatably mounted to said rod and secured to said primary reflectors on opposing ends thereof.

6. The electromagnetic radiation collector system as recited in claim 1 where each of said primary reflectors is a reflecting plate member having a primary reflecting surface for reflecting radiation energy to said secondary reflector.

7. The electromagnetic radiation collector system as recited in claim 6 where each of said primary reflectors includes a substantially planar reflecting surface.

8. The electromagnetic radiation collector system as recited in claim 1 where said secondary reflector includes a secondary reflector surface having a predetermined contour for secondarily reflecting said reflected radiation to a substantially line focus.

9. The electromagnetic radiation collector system as recited in claim 8 where said secondary reflector surface is substantially parabolic in contour.

10. The electromagnetic radiation collector system as recited in claim 9 where said secondary reflector parabolically contoured surface secondarily reflects said reflected radiation to said electromagnetic radiation collector means positioned substantially along said line focus.

11. The electromagnetic radiation collector system as recited in claim 9 where said secondary reflector is fixedly secured to said frame member, said secondary reflector being stationary with respect to a displacement of said primary reflectors and said source.

12. The electromagnetic radiation collector system as recited in claim 11 where said secondary reflector includes a multiplicity of secondary reflector surfaces extending substantially throughout said longitudinal extension of said primary reflectors.

13. The electromagnetic radiation collector system as recited in claim 9 where said secondary reflector is rotatably mounted to said frame member, said secondary reflector being adapted to be rotated about a secondary reflector rotation axis extending substantially normal said primary reflector axes of rotation.

14. The electromagnetic radiation collector system as recited in claim 13 where said secondary reflector includes a multiplicity of rotatably actuated secondary reflector surfaces extending substantially throughout said longitudinal extension of said primary reflectors.

15. The electromagnetic radiation collector system as recited in claim 13 where said radiation collector system includes means for rotating said secondary reflector about a third axis of rotation extending substantially normal said first axis of rotation of said primary reflectors.

16. The electromagnetic radiation collector system as recited in claim 15 where said means for rotating said secondary reflector about said third axis includes:
(a) third linear actuation means secured to said frame for linearly displacing third rod; and,
(b) at least one third connector link member rotatably connected to said third rod and secured to said secondary reflector on opposing ends thereof.

17. The electromagnetic radiation collector system as recited in claim 1 where said collector means includes at least one tubular absorption member secured in fixed relation to said frame member, said tubular absorption member having a radiation absorbing medium flowing therethrough.

18. The electromagnetic radiation collector system as recited in claim 1 where said collector means includes a fiber optic element having a radiation receiving surface positionally located at said focus of said secondary reflector.

19. The electromagnetic radiation collector system as recited in claim 18 where said fiber optic element includes a predetermined contour for directing a portion of the wavelength spectrum of said radiation from said radiation receiving surface to a predetermined area.

20. The electromagnetic radiation system as recited in claim 1 where said collector means includes radiation redirection means for directing a portion of the wavelength spectrum of said reflected radiation to a predetermined area.

21. The electromagnetic radiation collector system as recited in claim 20 where said radiation redirection means includes at least one substantially transparent optical plate extending in a direction coincident with said first axis of rotation, said plate having a beveled edge surface located at said secondary reflector focus.

22. The electromagnetic radiation collector system as recited in claim 21 where said beveled edge surface is mirror coated for reflecting radiation from said secondary reflector within said optical plate in said extension direction.

23. A method of collecting electromagnetic radiation for concentrating and absorbing radiation emitted by a radiation source, including the steps of:
(a) reflecting radiation from at least a pair of primary focusing concentrators having a pair of rotationally displaceable primary reflectors in a predetermined direction path, said reflecting radiation being initially concentrated in said direction path and rotationally displaceable about a first axis line of rotation passing through an extended length of said primary reflectors;
(b) secondarily reflecting radiation from at least one secondary reflector being positionally located substantially at a focal length of said primary reflectors, said secondary reflector having a focus line extending substantially normal said first axis line of rotation; and,
(c) collecting radiation being reflected from said secondary reflector along said focus line of said secondary reflector by radiation collector means, said first axis line of rotation of said primary reflectors extending in a direction substantially normal to an extended direction of said radiation collector means.

24. The method of collecting electromagnetic radiation as recited in claim 23 where the step of reflecting said radiation includes the step of orienting said primary reflectors in predetermined positional relation responsive to a displacement of said source.

25. The method of collecting electromagnetic radiation as recited in claim 24 where the steps of orienting includes the steps of rotationally actuating said primary reflectors about an axis of rotation substantially normal to a path displacement plane of said source.

26. The method of collecting electromagnetic radiation as recited in claim 25 where the step of rotating said primary reflectors includes the step of rotating said primary reflectors about a second axis of rotation extending in a direction substantially normal said first axis of rotation.

27. The method of collecting electromagnetic radiation as recited in claim 23 where the step of reflecting radiation includes the step of displacing a plurality of planar reflector members.

28. The method of collecting electromagnetic radiation as recited in claim 23 where the step of secondarily reflecting includes the step of positionally locating at least one parabolic reflecting surface at said focal length distance.

29. The method of collecting electromagnetic radiation as recited in claim 28 where said secondary reflector is formed of a plurality of parabolically formed reflecting members.

30. The method of collecting electromagnetic radiation as recited in claim 29 where the step of secondarily reflecting includes the step of rotationally displacing said secondary reflector responsive to said displacement of said source.

31. The method of collecting electromagnetic radiation as recited in claim 23 where the step of collecting radiation includes the step of positionally locating a radiation absorbing member substantially along said line focus of said secondary reflector.

32. The method of collecting electromagnetic radiation as recited in claim 31 where the step of positionally locating said radiation absorbing member is followed by the step of flowing an energy absorbing medium through said radiation absorbing member.

33. The method of collecting electromagnetic radiation as recited in claim 23 where the step of collecting radiation includes the step of redirecting a predetermined portion of the wavelength spectrum being reflected from said secondary reflector into a predetermined path contour.

34. The method of collecting electromagnetic radiation as recited in claim 33 where the step of redirecting includes the step of positioning a radiation intercepting surface of a fiber optic element substantially coincident to a line focus of said secondary reflector.

35. The method of collecting electromagnetic radiation as recited in claim 34 where said fiber optic element includes a predetermined contour for directing said radiation to a predetermined area.

36. The method of collecting electromagnetic radiation as recited in claim 35 including the step of locating an energy conversion means substantially at said predetermined area.

37. The method of collecting electromagnetic radiation as recited in claim 33 where the step of redirecting includes the step of inserting at least one substantially transparent member between said first and second reflectors, said transparent member being adapted to internally direct said portion of said radiation wavelength spectrum in a predetermined path.

38. The method of collecting electromagnetic radiation as recited in claim 37 where the step of inserting includes the step of establishing a reflective surface of said transparent member substantially coincident with said secondary reflector line focus, said reflective surface having a predetermined contour for redirecting said radiation internal said transparent member.

39. The method of collecting electromagnetic radiation as recited in claim 33 where the step of redirecting includes the step of positioning a reflecting convex element substantially coincident said secondary reflector line focus.

* * * * *